(No Model.)
T. SHEHAN.
CAR WHEEL.
No. 535,177. Patented Mar. 5, 1895.
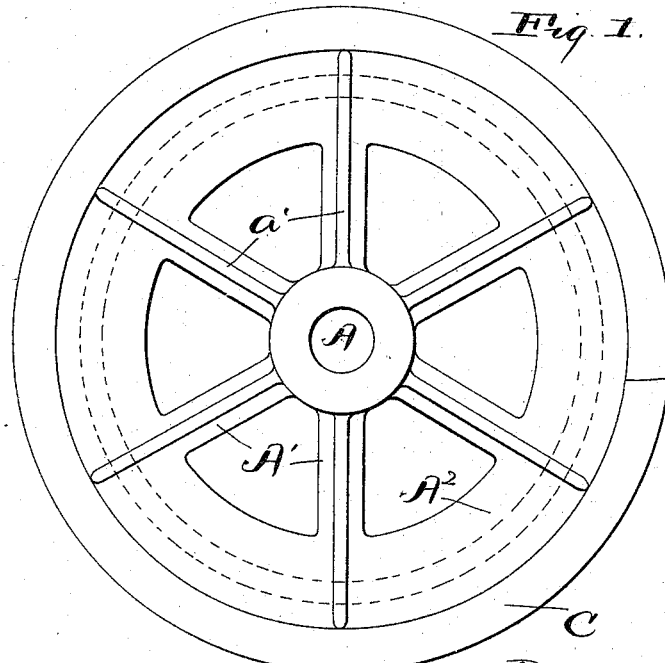
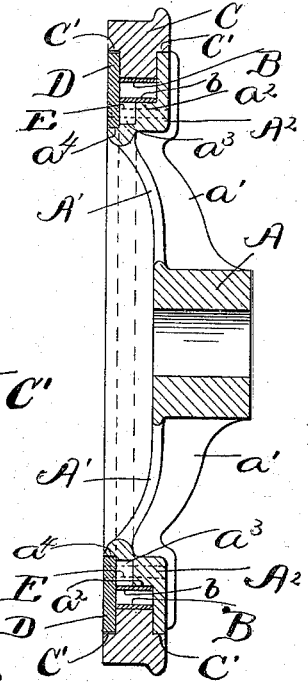
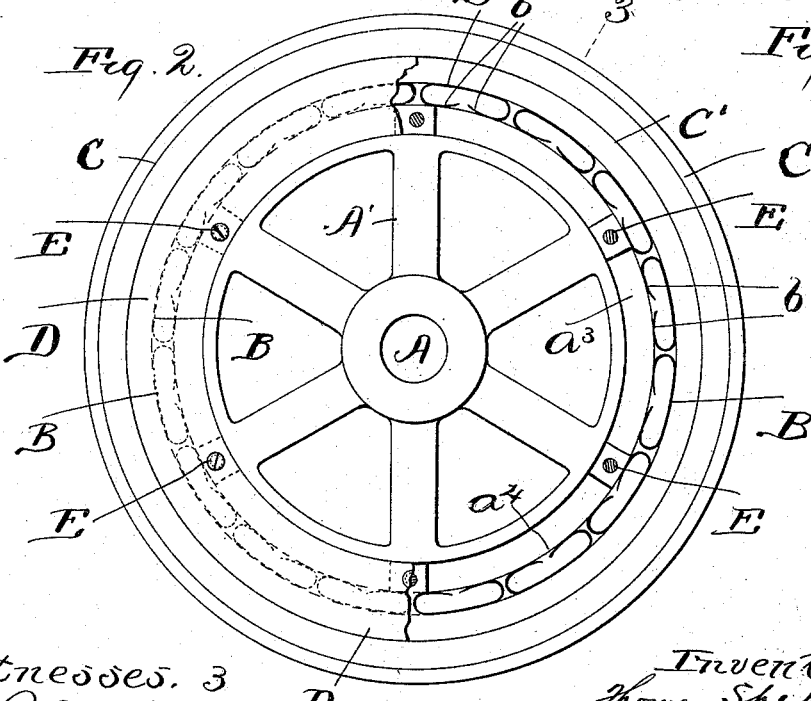
Witnesses.
E. B. Gilchrist
Inventor.
Thomas Shehan
By M. D. Leggett & Co.
his Attorneys.

UNITED STATES PATENT OFFICE.

THOMAS SHEHAN, OF CLEVELAND, OHIO.

CAR-WHEEL.

SPECIFICATION forming part of Letters Patent No. 535,177, dated March 5, 1895.

Application filed August 3, 1894. Serial No. 519,405. (No model.)

*To all whom it may concern:*

Be it known that I, THOMAS SHEHAN, of Cleveland, in the county of Cuyahoga and State of Ohio, have invented certain new and useful Improvements in Car-Wheels; and I do hereby declare the following to be a full, clear, and exact description of the invention, such as will enable others skilled in the art to which it pertains to make and use the same.

My invention relates to improvements in car-wheels provided with removable cushioned tires, and more especially designed for use on street-cars.

Before proceeding with a description of my improved car-wheel, I would remark that I am well aware that car-wheels having removable cushioned tires have heretofore been devised, and my invention, therefore, merely consists in the peculiarities of construction hereinafter described and pointed out in the claim, the object being to construct a car-wheel of the character indicated that is especially well adapted for street-car service and that is exceedingly simple and durable in construction.

In the accompanying drawings, Figure 1 is an elevation showing the inner face of a car-wheel embodying my invention. Fig. 2 is an elevation, showing the outer face of the wheel, parts being broken away and in section to more clearly show the construction. Fig. 3 is a transverse section on line 3—3, Fig. 2.

Referring to the drawings, A designates the hub of the wheel, A' the arms and $A^2$ the rim connecting the outer ends of the arms, the arms being arranged radially as shown and all of said parts being composed of a single piece. The arms are preferably ribbed, as at $a'$, on the inner face of the wheel, said ribs extending from the hub radially to the external periphery of the arm-connecting-rim as shown in Fig. 3. Rim $A^2$, a short distance from its inner side, is cut away circumferentially to form a seat $a^2$ for springs B that engage the inner periphery of the tire C of the wheel. Rim $A^2$, at the outer end of seat $a^2$, is further cut away circumferentially, as at $a^3$, to save metal, and to effect a reduction in weight, and, about midway between seat $a^2$ and the outer face of the wheel, is still further cut away to form a seat $a^4$ for an annular plate or ring D that has preferably the same external diameter as rim $a^2$ and is secured to said rim by bolts or screws E that extend through said rim and plate between the seat for the springs and the seat for said plate. The tire of the wheel fits easily between plate E and the opposing surface of rim $A^2$ and is enlarged in thickness at the external periphery of said rim and plate and thereby overlaps the plate and rim, as at $C'$.

An important feature of my invention consists in the peculiar construction of the springs that I employ. As shown very clearly in Figs. 2 and 3 the springs consist of strips of metal that are arranged at short intervals and circumferentially of seat $a^2$ on rim $A^2$, their central portion engaging the inner periphery of the tire, and the springs being bent laterally near each end in under the central portion, as at $b$, with said bent or end-members engaging the seat $a^2$ formed upon rim $A^2$.

A car-wheel involving the aforesaid construction of springs and arrangement of parts has been reduced to practice, and the results obtained are highly satisfactory.

What I claim is—

A car-wheel having a hub, arms and rim connecting the outer extremities of the arms, a removable tire held in place between the outer extremity of the rim and an annular plate or ring suitably secured to said rim, and leaf-springs arranged at short intervals circumferentially of the rim between the inner periphery of the tire and said rim, the aforesaid springs consisting of a strip of metal arranged circumferentially of the aforesaid rim, the central portion of the springs engaging the inner periphery of the tire, and the springs between the central portion and extremities being bent laterally in under the central portion with the end or bent members engaging the aforesaid rim, substantially as shown, for the purpose specified.

In testimony whereof I sign this specification, in the presence of two witnesses, this 14th day of July, 1894.

THOMAS SHEHAN.

Witnesses:
  C. H. DORER,
  WARD HOOVER.